(12) United States Patent
Poyarkov et al.

(10) Patent No.: US 8,887,577 B2
(45) Date of Patent: Nov. 18, 2014

(54) TENSOMETRIC TRANSDUCER

(75) Inventors: Alexander Vladimirovich Poyarkov, Troitsk (RU); Vladimir Alexandrovich Shatov, Moscow (RU); Alexei Sergeevich Rafailovich, Novosibirsk (RU); Viktor Nikolaevich Fedorinin, Novosibirsk (RU); Andrei Georgievich Paulish, Novosibirsk (RU)

(73) Assignee: Alexander Vladimirovich Poyarkov, Troitsk (RU)

( * ) Notice: Subject to any disclaimer, the term of this patent is extended or adjusted under 35 U.S.C. 154(b) by 87 days.

(21) Appl. No.: 13/642,711

(22) PCT Filed: Jul. 1, 2010

(86) PCT No.: PCT/RU2010/000369
§ 371 (c)(1),
(2), (4) Date: Oct. 22, 2012

(87) PCT Pub. No.: WO2011/133063
PCT Pub. Date: Oct. 27, 2011

(65) Prior Publication Data
US 2013/0036830 A1 Feb. 14, 2013

(30) Foreign Application Priority Data

Apr. 23, 2010 (RU) .............................. 2010116023

(51) Int. Cl.
*G01L 1/24* (2006.01)
*G01B 11/16* (2006.01)

(52) U.S. Cl.
CPC ............... *G01B 11/18* (2013.01); *G01L 1/241* (2013.01)
USPC .......................................................... 73/800

(58) Field of Classification Search
CPC ........... G01L 1/241; G01N 2021/1706; G01B 11/24; G01B 11/18
USPC ................................ 73/800, 862.324, 862.624
See application file for complete search history.

(56) References Cited

U.S. PATENT DOCUMENTS 3,786,681 A * 1/1974 Kiehn ..................... 73/382 R
4,002,934 A   1/1977 Slezinger et al.
(Continued)

FOREIGN PATENT DOCUMENTS

| SU | 847085 | 7/1981 |
| SU | 1136010 | 1/1985 |
| SU | 1536196 | 1/1990 |

OTHER PUBLICATIONS

International Search Report of PCT/RU2010/000369, Jan. 13, 2011.
(Continued)

*Primary Examiner* — Max Noori
(74) *Attorney, Agent, or Firm* — Collard & Roe, P.C.

(57) ABSTRACT

The tensometric transducer comprises a load element which is fixed to an object to be monitored, and a piezo-optical transducer which converts the magnitude of the stresses on a photoelastic element into an electrical signal, wherein the load element is in the form of a plate having a thinned portion at the fixing point for the photoelastic element, which is fixed in the plate in a preloaded state is such a way that the action of the initial load force is realized in two mutually perpendicular to directions, and a conical opening is formed in the center of the plate, the axis of the opening lying in a plane perpendicular to the load axis, wherein the photoelastic element is in the form of a truncated cone, wherein the angels of the taper of the opening and of the taper of the photoelastic element coincide with one another and are equal to a Morse taper.

5 Claims, 1 Drawing Sheet

(56) References Cited

U.S. PATENT DOCUMENTS

| | | | | |
|---|---|---|---|---|
| 4,870,865 A | * | 10/1989 | Hane et al. | 73/572 |
| 5,090,131 A | * | 2/1992 | Deer | 33/556 |
| 5,534,969 A | * | 7/1996 | Miyake | 355/53 |
| 6,856,399 B2 | * | 2/2005 | Kuskovsky et al. | 356/457 |
| 6,948,381 B1 | * | 9/2005 | Discenzo | 73/862.324 |
| 7,458,277 B2 | * | 12/2008 | Discenzo | 73/800 |

OTHER PUBLICATIONS

Handbook on Experimental Mechanics in 2 volumes: vol. 1. Translation from English/ed. by Albert S. Kobayashi—Moscow: Mir, 1990, pp 54-98.

Slezinger I.I. Piezo-optical measuring transducers, Izmeritelnaya tekhnika, 1985, No. 11, pp. 45-48 (in Russian).

\* cited by examiner

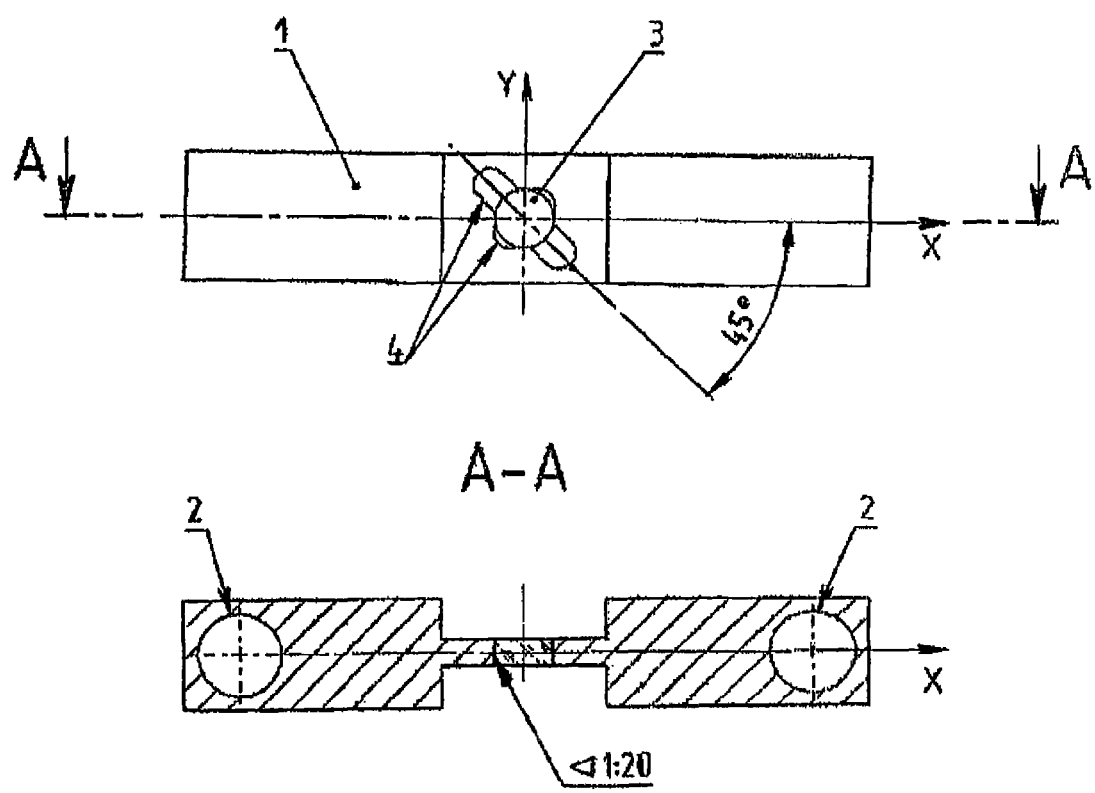

TENSOMETRIC TRANSDUCER

CROSS REFERENCE TO RELATED APPLICATIONS

This application is the National Stage of PCT/RU2010/000369 filed on Jul. 1, 2010, which claims priority under 35 U.S.C. §119 of Russian Application No. 2010116023 filed on Apr. 23, 2010, the disclosure of which is incorporated by reference. The international application under PCT article 21(2) was not published in English.

The invention relates to control instrumentation, especially designed for measurement of deformation or stress in various constructions by means of a polarization-optical transducer and it can be used in building, transportation and other industries and control instrumentation.

Today, transducers based on resistive-strain sensors are widely used for the measurement of deformation or stress (Handbook on Experimental Mechanics in 2 volumes: Vol. 1. Translation from English/ed. by Albert S. Kobayashi—Moscow: Mir, 1990, pp. 54-98).

The disadvantages of resistive-strain sensors are a low sensitivity, a low dynamic range, and a poor reproducibility of the procedure of adhering the resistive-strain sensors to the object to be monitored, the quality of which determines the sensor sensitivity.

It is known that the piezo-optical (photoelastic) effect is used for the measurement of deformations. A scheme of a piezo-optical transducer is described in a publication (Slezinger I. I. Piezo-optical measuring transducers, Izmeritelnaya tekhnika, 1985, No. 11, pp. 45-48 (in Russian)) and consists of optically connected elements: a light source, a polarizer, a photoelastic element, a phase plate, an analyzer and a photodetector and it is shown that a sensitivity of the piezo-optical transducers is three orders higher in comparison with resistive-strain sensors.

Most similar in its technical essence to the proposed strain-gauge transducer is a piezo-electrical device for the measurement of the deformation of an object (Inventor's Certificate SU No. 1536196, published 15 Jan. 1990, IPC G01B11/16) comprising support plates to be affixed to the object to be monitored, a photoelastic element attached to one of plates and two rods mounted between the photoelastic element and a second plate. The rods are arranged coaxially to the axis of the load, one rod being designed as hollow cylinder and the other as solid cylinder partly placed inside the hollow one. A deformation of the monitored object is transferred via the solid and hollow cylinders to a sensitive element made of a photoelastic material, which leads to a change of the intensity of the light beam which passes through the photoelastic element and impinges on the photodetector, and a corresponding change of the electric signal at the output of the photodetector under a sinusoidal law depending on the magnitude of deformation. The temperature compensation in this device is performed with the aid of two heating elements, placed on both cylinders and connected differentially to an amplifier of the electronic scheme of the device.

The disadvantage of the given device is that it works only for compressive deformation. Moreover, in order to provide maximum deformation sensitivity, the photoelastic element initially must be unloaded such that the initial measuring point is in the middle of the ascending (or descending) part of the sinusoidal signal curve, which necessarily requires the presence of some clearance (gap) between the photoelastic element and the cylinder transmitting the deformation, which has a negative effect on the measurement accuracy. Another disadvantage is the complicated system of thermo-compensation containing two heaters, which leads to a long time of sensor response which is limited by the thermal conductivity of the rods.

The object of the invention is to develop a strain gauge transducer which would work with equally high sensitivity both for compressive and tensile deformation and which does not require additional devices for thermo-compensation.

The technical result is a broadening of the functional capabilities, a simplification of the construction and design, an improvement of the reliability and accuracy of the deformation measurement.

The object is achieved due to the fact that in a known device including a load element fixed on the monitored object and a piezo-electric transducer transforming the magnitude of stress on the photoelastic element in an electrical signal, and a unit of signal processing, the load element is in the from of a plate providing a concentration of stresses on the photoelastic element, the photoelastic element being affixed to the plate in initially stressed state and in such a way that the initial stresses act in two mutually perpendicular directions.

The fixing of the photoelastic element in the plate in an initially stressed state provides that the strain gauge transducer operates both for a compressed as well as a stretching deformation. The loading of the initial stresses in two mutually perpendicular directions provides a constant distribution of stresses in the photoelastic element under deformation due to temperature variations, which in its turn provides an independence of the signal on temperature.

To increase the efficiency of the transfer of the measured deformation to the photoelastic element, the plate may have a variable cross-section, in particular the area around of photoelastic element can be thinner.

The fixing of the photoelastic element in the plate in an initially stressed state may be provided by carrying out a cone-shaped bore in the center of the plate, the axis of which is placed in a plane perpendicular to the axis of a load, and that the photoelastic element is in the from of a truncated cone; the angles of the bore cone and of the photoelastic element cone being equal to the Morse cone.

The action of the initial stresses in two mutually perpendicular directions can be achieved by forming of two mutually perpendicular through-the-thickness slits, saving the plate integrity, with axis which make an angle of 45° to the load axis, The centers of the slits coincide with the centre of cone-shaped bore for the fixation of the photoelastic element. Due to the slits, the photoelastic element is clamped in four points located in two mutually perpendicular directions.

The reduction of the influence of a temperature variation on the stress gauge operation is achieved as the slits mentioned above have different lengths.

Sintered quartz can be used as material for the photoelastic element because of a high threshold of plastic deformation and a high damage threshold under compression, what provides a high dynamic range of deformation measurement and reliability of the transducer.

The photoelastic element is clamped in the bore of the plate with initial stress, which provides a reliable fixing of the photoelastic element in the plate by means of the Morse cone. As the photoelastic element is compressed initially, the transducer has the same sensitivity both for stressing and stretching. Note that the photoelastic element is clamped in four points located in two mutually perpendicular directions. Under temperature variations the photoelastic element is stressed or stretched in isotropic way, and due to this there is no turn of the polarization vector of an initially polarized light beam passing through the photoelastic element. Hence, a temperature compensation of transducer is achieved. Due to the proposed way of photoelastic element fixing, the shape of the plate, the exclusion of additional thermo-compensation devices a simplification of the design is achieved and the accuracy of the deformation measurement is increased.

Accordingly the proposed combination of features, which determines the design of the strain gauge transducer, allows it to achieve the claimed technical result: the broadening its functional capabilities, design and construction simplification, an increase of the reliability and accuracy of deformation measurement.

BRIEF DESCRIPTION OF THE DRAWING

FIG. 1 shows a strain gauge transducer according to an embodiment of the invention, The description of the device is illustrated with FIG. 1, wherein 1—a load element (plate), 2—mounting holes. The plate is made thinner in the area around the photoelastic element 3. The photoelastic element 3 is fixed in the plate with a Morse cone. In the center of the plate there are two mutually perpendicular through-the-thickness slits 4 of different lengths which do not affect the integrity of the plate, the axes of which make angles of 45° to the load axis X, and the centers of slits coincide with the center of a bore cone for clamping of photoelastic element 3. Due to the slits, the photoelastic element is clamped in four points located in two mutually perpendicular directions X and Y.

The strain gauge transducer works in the following way. The load element 1 is fixed on the object to be monitored by means of mounting holes 2 in such a way that the axis of the plate to coincides with load axis X. Deformations due to stressing or compressing arising in the monitored object in X direction are transferred to the plate 1 via mounting holes 2, The plate deformation is transferred to the photoelastic element 3, which leads to additional stressing (+Δσx) or stretching (−Δσx) of the photoelastic element. As a result, in the piezo-electrical transducer an additional phase difference ±Δ occurs between mutually perpendicular components of the polarization of the light beam passing through the photoelastic element, which leads to a change of the electrical signal at the output of the photodetector of the piezoelectric transducer, which is registered and processed by the signal procession unit.

The invention claimed is:

1. The strain gauge transducer, comprising a load element which is mounted on the object to be monitored; and an piezooptical transducer which converts the magnitude of the stress on a photoelastic element into an electrical signal, wherein the load element is in the form of a plate in which the photoelastic element is fixed in initially stressed state and in such a way that the initial stresses act in two mutually perpendicular directions.

2. The strain gauge transducer of claim 1, wherein the plate comprises a thinned area around the photoelastic element.

3. The strain gauge transducer of claim 1, wherein a cone-shaped bore is carried out in the center of the plate, the axis of the bore being placed in a plane perpendicular to the load axis, the photoelastic element being executed as a truncated cone, and the angles of the bore cone and photoelastic element cone are equal to a Morse cone.

4. The strain gauge transducer of claim 1, wherein two mutually perpendicular through-the-thickness slits, preserving the plate integrity, are carried out with axes which make angles of 45° to the load axis, and the centers of the slits coincide with the centre of cone-shaped bore for the holding of the photoelastic element.

5. The strain gauge transducer of claim 4, wherein the through-the-thickness slits have different lengths.

* * * * *